United States Patent
Barrus et al.

(10) Patent No.: US 9,514,137 B2
(45) Date of Patent: Dec. 6, 2016

(54) HYBRID GARBAGE COLLECTION

(71) Applicant: Exablox Corporation, Sunnyvale, CA (US)

(72) Inventors: Frank Barrus, New Ipswich, NH (US); Tad Hunt, Sunnyvale, CA (US)

(73) Assignee: Exablox Corporation, Sunnyvale, CA (US)

(*) Notice: Subject to any disclaimer, the term of this patent is extended or adjusted under 35 U.S.C. 154(b) by 242 days.

(21) Appl. No.: 14/303,329

(22) Filed: Jun. 12, 2014

(65) Prior Publication Data

US 2014/0372490 A1 Dec. 18, 2014

Related U.S. Application Data

(60) Provisional application No. 61/834,097, filed on Jun. 12, 2013.

(51) Int. Cl.
G06F 17/30 (2006.01)

(52) U.S. Cl.
CPC ..... *G06F 17/30067* (2013.01); *G06F 17/3023* (2013.01); *G06F 17/30135* (2013.01); *G06F 17/30303* (2013.01); *G06F 17/30607* (2013.01)

(58) Field of Classification Search
CPC .......... Y10S 707/955; Y10S 707/99945; Y10S 707/99957; G06F 17/30067; G06F 17/30303; G06F 17/30607; G06F 17/3023

See application file for complete search history.

(56) References Cited

U.S. PATENT DOCUMENTS

| | | |
|---|---|---|
| 4,656,604 A | 4/1987 | van Loon |
| 4,660,130 A | 4/1987 | Bartley et al. |
| 5,420,999 A | 5/1995 | Mundy |
| 5,561,778 A | 10/1996 | Fecteau et al. |
| 5,950,205 A | 9/1999 | Aviani, Jr. |
| 6,098,079 A | 8/2000 | Howard |

(Continued)

FOREIGN PATENT DOCUMENTS

| | | |
|---|---|---|
| EP | 1285354 | 2/2003 |
| EP | 2575379 | 4/2013 |

(Continued)

OTHER PUBLICATIONS

Jose A. Joao, Onur Mutlu, and Yale N. Patt, "Flexible Reference-Counting-Based Hardware Acceleration for Garbage Collection", Jun. 2009, ISCA '09: Proceedings of the 36th annual international symposium on Conmputer Architecture, pp. 418-428.*

(Continued)

*Primary Examiner* — Cheryl Lewis
(74) *Attorney, Agent, or Firm* — Carr & Ferrell LLP

(57) ABSTRACT

Disclosed is a method for hybrid garbage collection of objects in a file system. An example method includes associating, with each object in the file system, a reference counter, an expiration time, and a version identifier. The object is can be kept in the file system while the reference counter of the object is non-zero. After determining that the reference counter of the object is zero, the object can be kept in the file system up to the expiration time associated with the object. When a reference referring to the object is deleted, the expiration time of the object is updated to the latest of the expiration times of the object and the reference. Furthermore, the object can be kept in the file system while the version identifier of the object is larger than a predetermined version number.

20 Claims, 7 Drawing Sheets

(56) References Cited

U.S. PATENT DOCUMENTS

| | | |
|---|---|---|
| 6,154,747 A | 11/2000 | Hunt |
| 6,167,437 A | 12/2000 | Stevens et al. |
| 6,314,435 B1 | 11/2001 | Wollrath et al. |
| 6,356,916 B1 | 3/2002 | Yamatari et al. |
| 6,480,950 B1 | 11/2002 | Lyubashevskiy et al. |
| 6,772,162 B2 * | 8/2004 | Waldo .................. G06F 9/4411 |
| 6,839,823 B1 | 1/2005 | See et al. |
| 7,043,494 B1 | 5/2006 | Joshi et al. |
| 7,177,980 B2 | 2/2007 | Milillo et al. |
| 7,197,622 B2 | 3/2007 | Torkelsson et al. |
| 7,266,555 B1 | 9/2007 | Coates et al. |
| 7,293,140 B2 | 11/2007 | Kano |
| 7,392,421 B1 | 6/2008 | Bloomstein et al. |
| 7,403,961 B1 | 7/2008 | Deepak et al. |
| 7,454,592 B1 | 11/2008 | Shah et al. |
| 7,509,360 B2 * | 3/2009 | Wollrath ............... G06F 9/4411 |
| 7,539,836 B1 | 5/2009 | Klinkner |
| 7,685,109 B1 | 3/2010 | Ransil et al. |
| 7,725,437 B2 | 5/2010 | Kirshenbaum et al. |
| 7,827,218 B1 | 11/2010 | Mittal |
| 7,895,666 B1 | 2/2011 | Eshghi et al. |
| 7,990,979 B2 | 8/2011 | Lu et al. |
| 8,019,882 B2 | 9/2011 | Rao et al. |
| 8,099,605 B1 | 1/2012 | Billsrom et al. |
| 8,132,168 B2 | 3/2012 | Wires et al. |
| 8,364,887 B2 | 1/2013 | Wong et al. |
| 8,407,438 B1 | 3/2013 | Ranade |
| 8,447,733 B2 | 5/2013 | Sudhakar |
| 8,572,290 B1 | 10/2013 | Mukhopadhyay et al. |
| 8,868,926 B2 | 10/2014 | Hunt et al. |
| 9,009,202 B2 * | 4/2015 | Patterson ............ G06F 12/0261 707/813 |
| 9,043,567 B1 | 5/2015 | Modukuri et al. |
| 2002/0069340 A1 | 6/2002 | Tindal et al. |
| 2002/0087590 A1 | 7/2002 | Bacon et al. |
| 2003/0028514 A1 | 2/2003 | Lord et al. |
| 2003/0028585 A1 | 2/2003 | Yeager et al. |
| 2003/0056139 A1 | 3/2003 | Murray et al. |
| 2003/0072259 A1 | 4/2003 | Mor |
| 2003/0101173 A1 | 5/2003 | Lanzatella et al. |
| 2003/0115408 A1 | 6/2003 | Milillo et al. |
| 2004/0093361 A1 | 5/2004 | Therrien et al. |
| 2004/0111610 A1 | 6/2004 | Slick et al. |
| 2004/0158588 A1 | 8/2004 | Pruet |
| 2004/0167898 A1 | 8/2004 | Margolus et al. |
| 2005/0071335 A1 | 3/2005 | Kadatch |
| 2005/0080928 A1 | 4/2005 | Beverly et al. |
| 2005/0081041 A1 | 4/2005 | Hwang |
| 2005/0083759 A1 | 4/2005 | Wong et al. |
| 2005/0138271 A1 | 6/2005 | Bernstein et al. |
| 2005/0160170 A1 | 7/2005 | Schreter |
| 2005/0256972 A1 | 11/2005 | Cochran et al. |
| 2006/0039371 A1 | 2/2006 | Castro et al. |
| 2006/0083247 A1 | 4/2006 | Mehta |
| 2006/0156396 A1 | 7/2006 | Hochfield et al. |
| 2006/0271540 A1 | 11/2006 | Williams |
| 2006/0271604 A1 | 11/2006 | Shoens |
| 2007/0005746 A1 | 1/2007 | Roe et al. |
| 2007/0130232 A1 | 6/2007 | Therrien et al. |
| 2007/0203960 A1 | 8/2007 | Guo |
| 2007/0230368 A1 | 10/2007 | Shi et al. |
| 2007/0233828 A1 | 10/2007 | Gilbert |
| 2007/0271303 A1 | 11/2007 | Menendez et al. |
| 2007/0276838 A1 | 11/2007 | Abushanab et al. |
| 2007/0276843 A1 | 11/2007 | Lillibridge et al. |
| 2008/0005624 A1 | 1/2008 | Kakivaya et al. |
| 2008/0016507 A1 | 1/2008 | Thomas et al. |
| 2008/0052446 A1 | 2/2008 | Lasser et al. |
| 2008/0126434 A1 | 5/2008 | Uysal et al. |
| 2008/0133893 A1 | 6/2008 | Glew |
| 2008/0147872 A1 | 6/2008 | Regnier |
| 2008/0170550 A1 | 7/2008 | Liu et al. |
| 2008/0183973 A1 | 7/2008 | Aguilera et al. |
| 2008/0243879 A1 | 10/2008 | Gokhale et al. |
| 2008/0243938 A1 | 10/2008 | Kottomtharayil et al. |
| 2008/0244199 A1 | 10/2008 | Nakamura et al. |
| 2008/0292281 A1 | 11/2008 | Pecqueur et al. |
| 2009/0049240 A1 | 2/2009 | Oe et al. |
| 2009/0100212 A1 | 4/2009 | Boyd et al. |
| 2009/0172139 A1 | 7/2009 | Wong et al. |
| 2009/0198927 A1 | 8/2009 | Bondurant et al. |
| 2009/0199041 A1 | 8/2009 | Fukui et al. |
| 2009/0307292 A1 | 12/2009 | Li et al. |
| 2009/0327312 A1 | 12/2009 | Kakivaya et al. |
| 2010/0023941 A1 | 1/2010 | Iwamatsu et al. |
| 2010/0031000 A1 | 2/2010 | Flynn et al. |
| 2010/0036862 A1 | 2/2010 | Das et al. |
| 2010/0114336 A1 | 5/2010 | Konieczny et al. |
| 2010/0114905 A1 | 5/2010 | Slavik et al. |
| 2010/0122330 A1 | 5/2010 | McMillan et al. |
| 2010/0161817 A1 | 6/2010 | Xiao et al. |
| 2010/0172180 A1 | 7/2010 | Paley et al. |
| 2010/0191783 A1 | 7/2010 | Mason et al. |
| 2010/0217953 A1 | 8/2010 | Beaman et al. |
| 2010/0228798 A1 | 9/2010 | Kodama et al. |
| 2010/0262797 A1 | 10/2010 | Rosikiewicz et al. |
| 2010/0318645 A1 | 12/2010 | Hoole et al. |
| 2010/0332456 A1 | 12/2010 | Prahlad et al. |
| 2011/0026439 A1 | 2/2011 | Rollins |
| 2011/0029711 A1 | 2/2011 | Dhuse et al. |
| 2011/0034176 A1 | 2/2011 | Lord et al. |
| 2011/0060918 A1 | 3/2011 | Troncoso Pastoriza et al. |
| 2011/0106795 A1 | 5/2011 | Maim |
| 2011/0138123 A1 | 6/2011 | Gurajada et al. |
| 2011/0213754 A1 | 9/2011 | Bindal et al. |
| 2011/0231374 A1 | 9/2011 | Jain et al. |
| 2011/0231524 A1 | 9/2011 | Lin et al. |
| 2011/0264712 A1 | 10/2011 | Ylonen |
| 2011/0264989 A1 | 10/2011 | Resch et al. |
| 2011/0271007 A1 | 11/2011 | Wang et al. |
| 2012/0011337 A1 | 1/2012 | Aizman |
| 2012/0030260 A1 | 2/2012 | Lu et al. |
| 2012/0030408 A1 | 2/2012 | Flynn et al. |
| 2012/0047181 A1 | 2/2012 | Baudel |
| 2012/0060072 A1 | 3/2012 | Simitci et al. |
| 2012/0078915 A1 | 3/2012 | Darcy |
| 2012/0096217 A1 | 4/2012 | Son et al. |
| 2012/0147937 A1 | 6/2012 | Goss et al. |
| 2012/0173790 A1 | 7/2012 | Hetzler et al. |
| 2012/0179808 A1 | 7/2012 | Bergkvist et al. |
| 2012/0179820 A1 | 7/2012 | Ringdahl et al. |
| 2012/0185555 A1 | 7/2012 | Regni et al. |
| 2012/0210095 A1 | 8/2012 | Nellans et al. |
| 2012/0233251 A1 | 9/2012 | Holt et al. |
| 2012/0278511 A1 | 11/2012 | Alatorre et al. |
| 2012/0290535 A1 | 11/2012 | Patel et al. |
| 2012/0290629 A1 | 11/2012 | Beaverson et al. |
| 2012/0310892 A1 | 12/2012 | Dam et al. |
| 2012/0323850 A1 | 12/2012 | Hildebrand et al. |
| 2012/0331528 A1 | 12/2012 | Fu et al. |
| 2013/0013571 A1 | 1/2013 | Sorenson, III et al. |
| 2013/0041931 A1 | 2/2013 | Brand |
| 2013/0054924 A1 | 2/2013 | Dudgeon et al. |
| 2013/0067270 A1 | 3/2013 | Lee et al. |
| 2013/0073821 A1 | 3/2013 | Flynn et al. |
| 2013/0086004 A1 | 4/2013 | Chao et al. |
| 2013/0091180 A1 | 4/2013 | Vicat-Blanc-Primet et al. |
| 2013/0162160 A1 | 6/2013 | Ganton et al. |
| 2013/0166818 A1 | 6/2013 | Sela |
| 2013/0185508 A1 | 7/2013 | Talagala et al. |
| 2013/0232313 A1 | 9/2013 | Patel et al. |
| 2013/0235192 A1 | 9/2013 | Quinn et al. |
| 2013/0246589 A1 | 9/2013 | Klemba et al. |
| 2013/0262638 A1 | 10/2013 | Kumarasamy et al. |
| 2013/0263151 A1 | 10/2013 | Li et al. |
| 2013/0268644 A1 | 10/2013 | Hardin et al. |
| 2013/0268770 A1 | 10/2013 | Hunt et al. |
| 2013/0282798 A1 | 10/2013 | McCarthy et al. |
| 2013/0288668 A1 | 10/2013 | Pragada et al. |
| 2013/0311574 A1 | 11/2013 | Lal |
| 2013/0346591 A1 | 12/2013 | Carroll et al. |
| 2013/0346839 A1 | 12/2013 | Dinha |
| 2014/0006580 A1 | 1/2014 | Raghu |
| 2014/0007178 A1 | 1/2014 | Gillum et al. |

(56) References Cited

U.S. PATENT DOCUMENTS

| | | |
|---|---|---|
| 2014/0059405 A1 | 2/2014 | Syu et al. |
| 2014/0143206 A1 | 5/2014 | Pittelko |
| 2014/0297604 A1 | 10/2014 | Brand |
| 2014/0317065 A1 | 10/2014 | Barrus |
| 2014/0335480 A1 | 11/2014 | Asenjo et al. |
| 2014/0351419 A1 | 11/2014 | Hunt et al. |
| 2014/0379671 A1 | 12/2014 | Barrus et al. |
| 2015/0012763 A1 | 1/2015 | Cohen et al. |
| 2015/0019491 A1 | 1/2015 | Hunt et al. |
| 2015/0066524 A1 | 3/2015 | Fairbrothers et al. |
| 2015/0081964 A1 | 3/2015 | Kihara et al. |
| 2015/0106335 A1 | 4/2015 | Hunt et al. |
| 2015/0106579 A1 | 4/2015 | Barrus |
| 2015/0172114 A1 | 6/2015 | Tarlano et al. |
| 2015/0220578 A1 | 8/2015 | Hunt et al. |
| 2015/0222616 A1 | 8/2015 | Tarlano et al. |

FOREIGN PATENT DOCUMENTS

| | | |
|---|---|---|
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| EP | 3055794 | 8/2016 |
| EP | 3058466 | 8/2016 |
| JP | 2004252663 A | 9/2004 |
| JP | 2010146067 A | 7/2010 |
| JP | 2011095976 A | 5/2011 |
| JP | 2012048424 A | 3/2012 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |
| WO | WO2014205286 | 12/2014 |
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Frank Dabek, M. Frans Kaashoek, David Karger, Robert Morris, and Ion Stoica, "Wide-Area Cooperative Storage With CFS", Proceedings of the 18th ACM Symposium on Operating System Principles (SOSP 01), pp. 202-215, Oct. 2001.*
Extended European Search Report dated Aug. 20, 2015 5647EP Application No. 13772293.0.
Office Action dated Mar. 15, 2016 in Japanese Patent Application No. 2015-504769 filed Apr. 8, 2013.
International Search Report dated Apr. 2, 2015 6340PCT Application No. PCT/US2014/045822.
International Search Report dated May 14, 2015 6450PCT Application No. PCT/US2015/013611.
International Search Report dated May 15, 2015 6341PCT Application No. PCT/US2015/014492.
Invitation pursuant to Rule 63(1) dated May 19, 2015 5847EP Application No. 13772293.0.
Extended European Search Report dated Aug. 4, 2015 5901EP Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
International Search Report dated Aug. 6, 2013 5901PCT Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 5847PCT Application No. PCT/US2013/035673.
International Search Report dated Sep. 10, 2014 6362PCT Application No. PCT/US2014/035008.
Askitis, Nicolas et al., "HAT-trie: A Cache-conscious Trie-based Data Structure for Strings".
International Search Report dated Sep. 24, 2014 6342PCT Application No. PCT/US2014/039036.
International Search Report dated Oct. 22, 2014 6360PCT Application No. PCT/US2014/043283.
International Search Report dated Nov. 7, 2014 6361PCT Application No. PCT/US2014/042155.
International Search Report dated Jan. 1, 2015 6359PCT Application No. PCT/US2014/060176.
International Search Report dated Feb. 24, 2015 6359PCT Application No. PCT/US2014/060280.
International Search Report dated Mar. 4, 2015 6337PCT Application No. PCT/US2014/067110.
Final Office Action, Nov. 27, 2015, U.S. Appl. No. 13/441,592, filed Apr. 6, 2012.
Advisory Action, Feb. 19, 2016, U.S. Appl. No. 13/441,592, filed Apr. 6, 2012.
Final Office Action, Nov. 27, 2015, U.S. Appl. No. 14/171,651, filed Feb. 3, 2014.
Final Office Action, Nov. 20, 2015, U.S. Appl. No. 14/055,662, filed Oct. 16, 2013.
Advisory Action, Jan. 29, 2016, U.S. Appl. No. 14/055,662, filed Oct. 16, 2013.
Office Action, Dec. 10, 2015, U.S. Appl. No. 13/939,106, filed Jul. 10, 2013.
Non-Final Office Action, Jan. 11, 2016, U.S. Appl. No. 14/284,351, filed May 21, 2014.
Advisory Action, Jan. 12, 2016, U.S. Appl. No. 14/171,651, filed Feb. 3, 2014.
Office Action, Mar. 15, 2016, U.S. Appl. No. 14/171,651, filed Feb. 3, 2014.
Office Action, Apr. 5, 2016, U.S. Appl. No. 14/257,905, filed Apr. 21, 2014.
Office Action, Apr. 21, 2016, U.S. Appl. No. 14/105,099, filed Dec. 12, 2013.
Notice of Allowance dated Jul. 26, 2016 for Japanese Patent Application No. 2015-504768 filed Apr. 8, 2013, pp. 1-4.

* cited by examiner

HYBRID GARBAGE COLLECTION

CROSS-REFERENCE TO RELATED APPLICATIONS

The present application claims benefit of U.S. provisional application No. 61/834,097, filed on Jun. 12, 2013. The disclosure of the aforementioned application is incorporated herein by reference for all purposes.

TECHNICAL FIELD

This disclosure relates generally to data processing and, more particularly, to a hybrid garbage collection method.

DESCRIPTION OF RELATED ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In computer systems, data in a file system on a hard disk (HDD), solid state disk (SSD), or some other storage is usually organized as objects and references pointing to these objects. An object may have many references pointing to it; additionally the object itself can hold references that point to other objects. Thus, typically data is organized as trees of data blocks.

In order to effectively operate resources of various storage devices, it is important to set up a procedure for removing objects that are no longer needed.

Traditional file systems keep only the last version of a data object. The garbage collection in the traditional file systems involves running a special process that analyzes the whole object database to find objects that are no longer referenced by other objects and remove them.

Some of the traditional garbage collection techniques use reference counting. The reference counting tracks the number of references pointing to a given object on the fly. If there are no references pointing to the object then the object is no longer in use and can be removed from the object database and the space on the storage device used by this object can be labeled as unoccupied and used for other objects.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The technology disclosed herein is related to garbage collection in a file system. The file system can be set up to initially keep every version of all objects in the system, no matter how small the change is. This approach allows generating many back up versions of the files and snapshots of the entire file system. However, keeping previous versions of all objects in the file system would generate a huge number of data objects, eventually running out of storage space. Therefore, to overcome this issue, a special garbage collection technique is needed, which periodically thins out previous versions, keeping only snapshots considered to be important enough to keep.

In some embodiments, time intervals for which previous versions of objects should be kept can be defined. For example, a garbage collection rule may be set up to keep all snapshots taken within the last 5 minutes, one version per hour for each snapshot taken within the last 24 hours, and one version per day for the snapshots associated with an older time period.

In some embodiments, the data objects can be organized as trees of data blocks, with the data blocks spread over a cluster of storage devices. Therefore, a technique is provided to propagate the predefined snapshot expiration times from the root references in the data tree to all reference blocks.

In some embodiments, a method for hybrid garbage collection of objects in a file system may include associating a reference counter, an expiration time, and a version identifier with an object in the file system. The method allows for keeping the object in the file system while the reference counter of the object is non-zero. The method may further include keeping the object in the file system up to the expiration time associated with the object at which time the reference counter of the object becomes zero. In addition, the method allows for keeping the object in the file system while the version identifier associated with the object is larger than a predefined maximum version.

In some embodiments, the method may include determining that a reference counter associated with an existing reference referring to the object is zero. In response to the determination, the reference counter of the object is decreased by one and the expiration time associated with the object is set to the latest of the expiration time of the object and the expiration time of the reference.

In some embodiments, the method may further include determining that the reference counter associated with the object is zero and a new reference referring the object is about to be added. In response to the determination, the reference counter can be increased by one, and all objects referred to by this object will likewise have their reference counters increased by one. The expiration time associated with the object may be updated concurrently to the latest of the expiration time of the object and the expiration time of the new reference. In further embodiments, the initial expiration time of the object in the file system can be calculated using a time period elapsed between adding current and new versions of the object.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
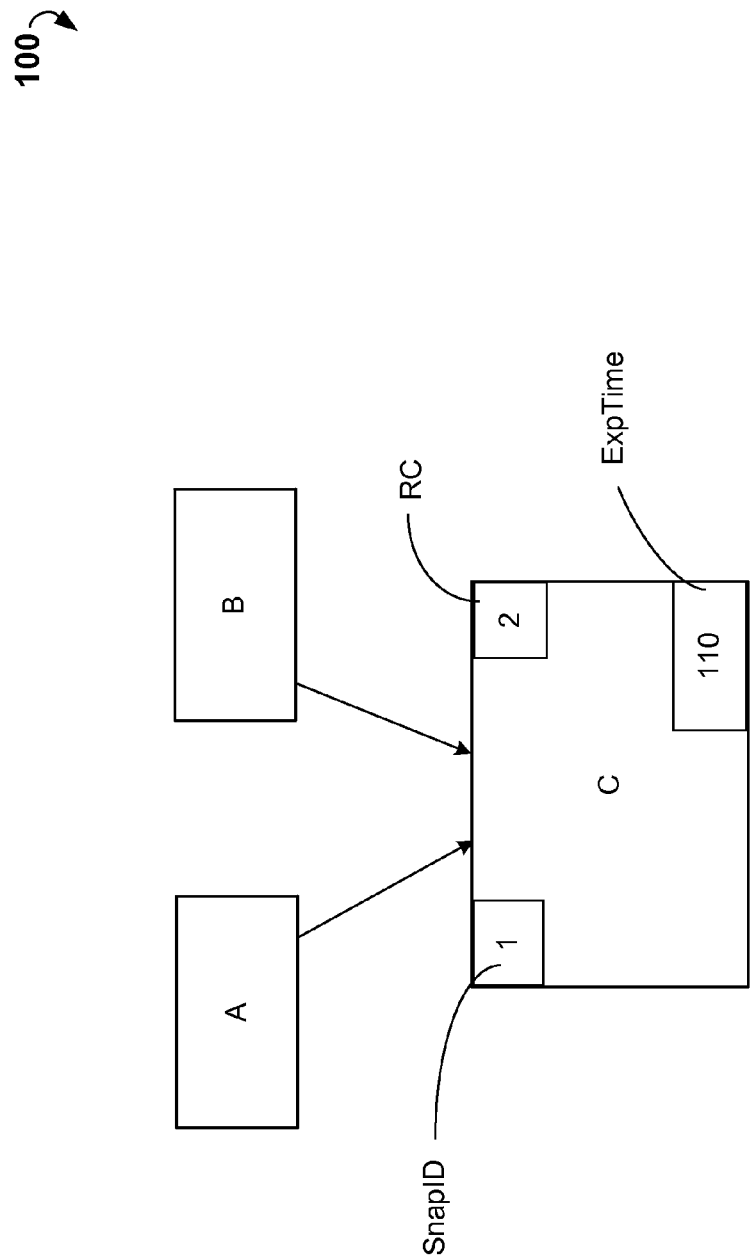
FIG. 1 shows an example of a data object with some references pointing to it and having associated attributes.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

In certain embodiments, data in a file system is represented as a graph of data objects. Some data objects can hold pointers, also known as references, to other data objects. At the same time data objects can be referenced by several other data objects pointing to them. These pointers or references can be stored in many ways, including, but not limited to, storing a key identifier for the referenced object, where such key identifier may, in some embodiments, be represented by the hash of the contents of the object.

In some embodiments, at least three attributes can be associated with each data object in the file system. These attributes can include a reference counter (RC), an expiration time (ExpTime), and a snapshot (or version) identification number (SnapID).

The reference counter RC indicates how many other objects are pointing to this object. The reference counter is increased by one when a new reference pointing to the object is added, and is decreased by one when an existing reference pointing to the object is deleted.

The expiration time ExpTime is a period of time for which the object should be kept in the object store after the reference counter for the object becomes zero or is set to zero. This time may be stored using absolute or relative values and may be represented either as linear time or a numbered series of significant events. The non-expired objects with zero reference counters can be referred to as archive objects. The archived objects will not be deleted until they have no references and have expired. However, just because an object has not been deleted yet does not mean it is an archive object. Such objects that have no live references, and have expired, but are not yet deleted, can be referred to as "Zombie" objects. The objects with reference counter equal to or larger than one can be referred to as live objects. A snap identification number indicates which snapshot version of the file system is associated with the given object.

The snapshot identification number SnapID is monotonically increasing and is computed from the SnapID recorded in the root object, which results in a new root object.

FIG. 1 shows an example 100 of data object C. Two other objects A and B reference object C, so the reference counter of object C is equal to two.

If the reference counter of an object becomes zero and if the object is pointing to at least one child object, then the expiration time of the child object will be reset to the latest of the expiration time of the parent and the expiration time of the child object. This rule ensures that the child object is kept in the file system for at least as long as the parent object.

Figure 2:
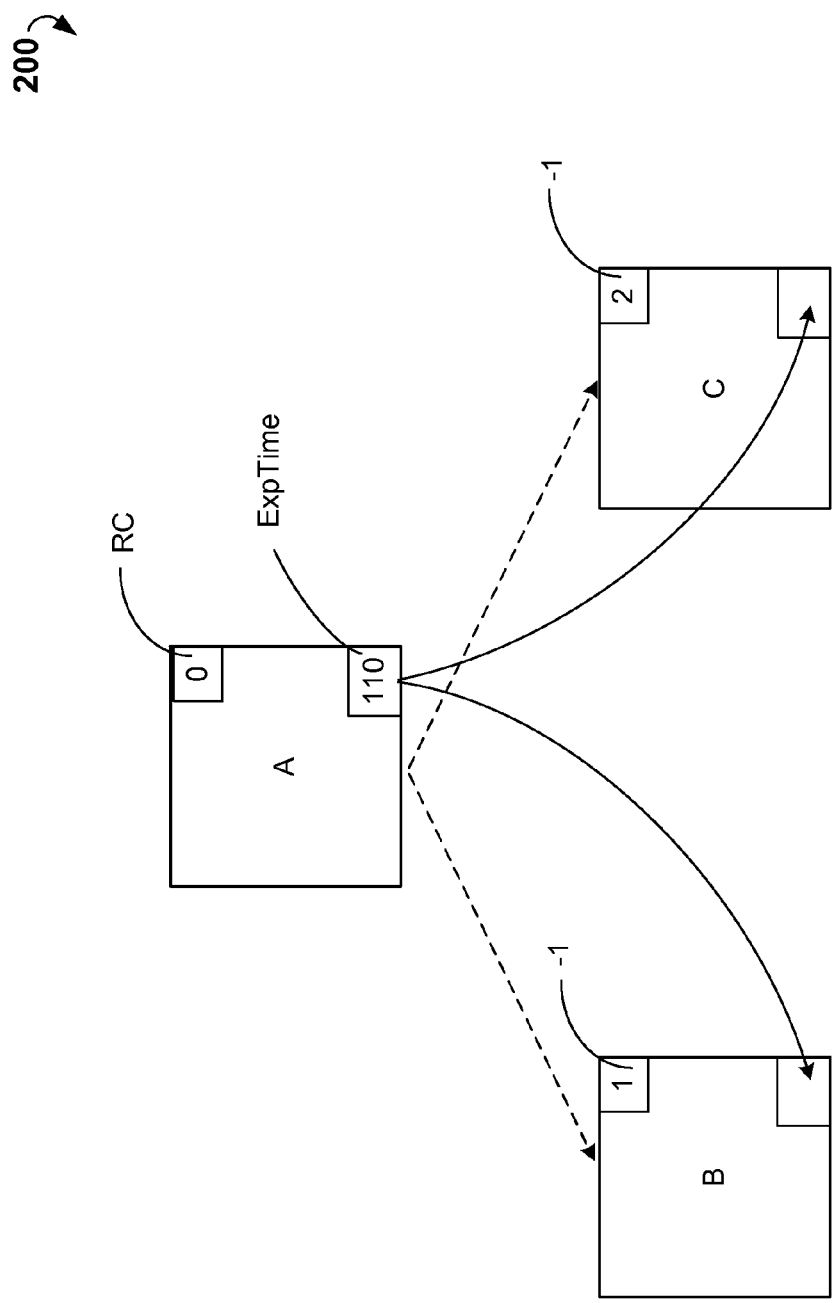
FIG. 2 shows an example of a deletion of a reference pointing to two other objects and propagation of a reference counter and expiration time to objects from the reference being removed.

In an example 200 shown in FIG. 2, object A references objects B and C. Since the reference counter of object A becomes zero, object A is moved from live objects to archive objects. The reference counters of the children objects B and C are decreased by one. The expiration time of object A is used to set up expiration times for objects B and C.

Figure 3:
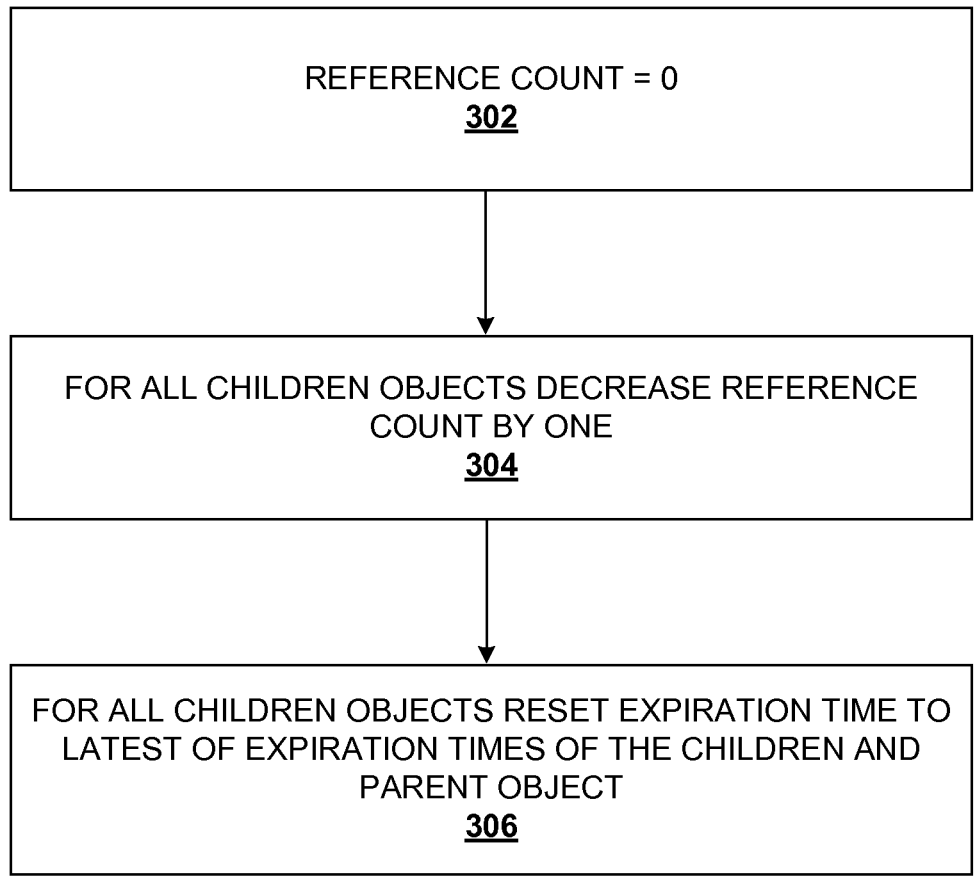
FIG. 3 is a flow chart showing a method for propagation of reference counters and expiration times from a parent object to child objects when the reference counter of the parent object becomes zero or is set to zero.

FIG. 3 is a flow chart showing a method 300 for propagation of reference counters and expiration times from a parent object to child objects when the reference counter of the parent object becomes zero or is set to zero. In step 302, the method 300 can commence with determining that the reference counter of the parent object becomes zero or is set to zero. In step 304, the method 300 continues with decreasing reference counter by one for all child objects. In step 306, the method 300 may proceed with resetting expiration time to the latest of expiration times of child and parent object for all child objects.

Figure 4:
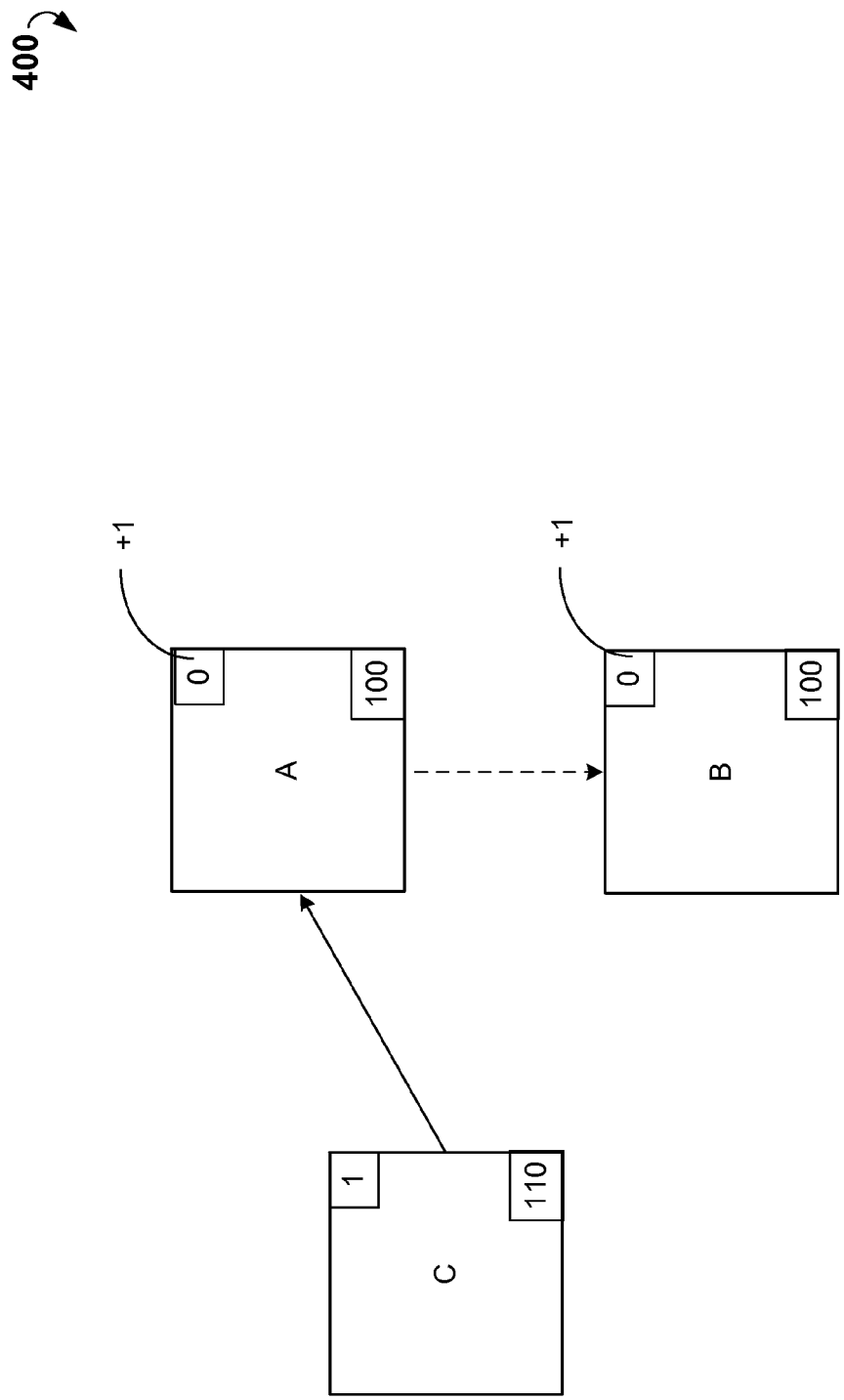
FIG. 4 shows an example of adding a new reference to the archive object.

An archive object may become live again if some other live object starts pointing to it. FIG. 4 shows an example 400 of two archive objects A and B, object A references object B when both objects are live. Object C is added as a reference for object A. Therefore, the reference counter of object A will be reset back to 1 and the expiration time will be reset to the latest of the expiration times of object A and its parent object C. Since the reference counter of object A is not zero, object A becomes live and is now pointing to archive object B. Therefore, the reference counter and the expiration time will be propagated down to object B and its children objects if they exist.

Figure 5:
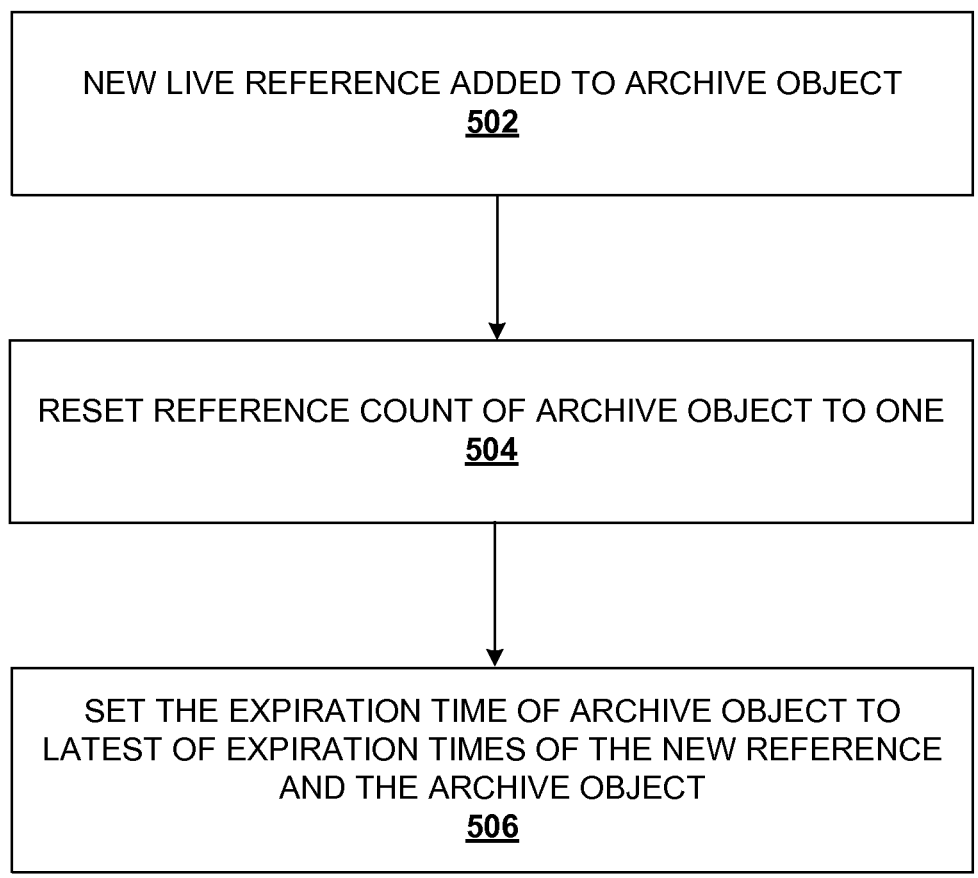
FIG. 5 is a flow chart showing a method for propagation of reference counters and expiration times from a live parent object to an archive child object.

FIG. 5 is a flow chart showing a method 500 for propagation of reference counters and expiration times from a live parent object to an archive child object. In step 502, the method 500 may commence with determining that a new live reference is added to an archive object. In step 504, the method 500 may proceed with resetting reference counter of the archive object to one. In step 506, the method 500 may include setting the expiration time of archive object to the latest of expiration times of the new live reference and the archive object. As result of operation of method 500 the archive object becomes a live object.

In some embodiments, the file system can contain a special type of reference object referred to as an Inode. The modes are used to organize snapshot history of the file system. Each data entity in the file system is associated with a chain of linked Inodes. The Inodes in the chain reference a different version of data entity. Each time a data entity is changed a new Inode is added to the end of the chain, with the last Inode pointing to the last version of the data entity.

The change in the data entity propagates to its parent entity, i.e. the directory where this data entity resides. All entities involved in a single change of the system receive a new Inode at the top of their chain. All Inodes created in the single file system change are assigned the same SnapID attribute. The SnapID is always increased by some value when a change in the file system occurs.

The Inode objects have special rules for reference counting. The reference counter of the first Inode in the chain that is directly referenced by a live directory is never less than one. The last Inode in the chain gets an extra reference simply because it is the latest live version of that Inode. If that happens to also be the Inode version that is referenced by a live directory, then it will have a count of two. The reference counters of all the other Inodes in the chain are set to zero. Each time a new Inode is added to the top of the chain, its reference counter is set to one, and the reference counter of its predecessor in the chain is decreased by one. This Inode and the data entity referenced by this Inode becomes an archive object and both can be deleted after their expiration time. The expiration time of that Inode is also computed when this occurs, according to the expiration policy, and using the knowledge of the starting and ending time of the prior Inode version.

Figure 6:
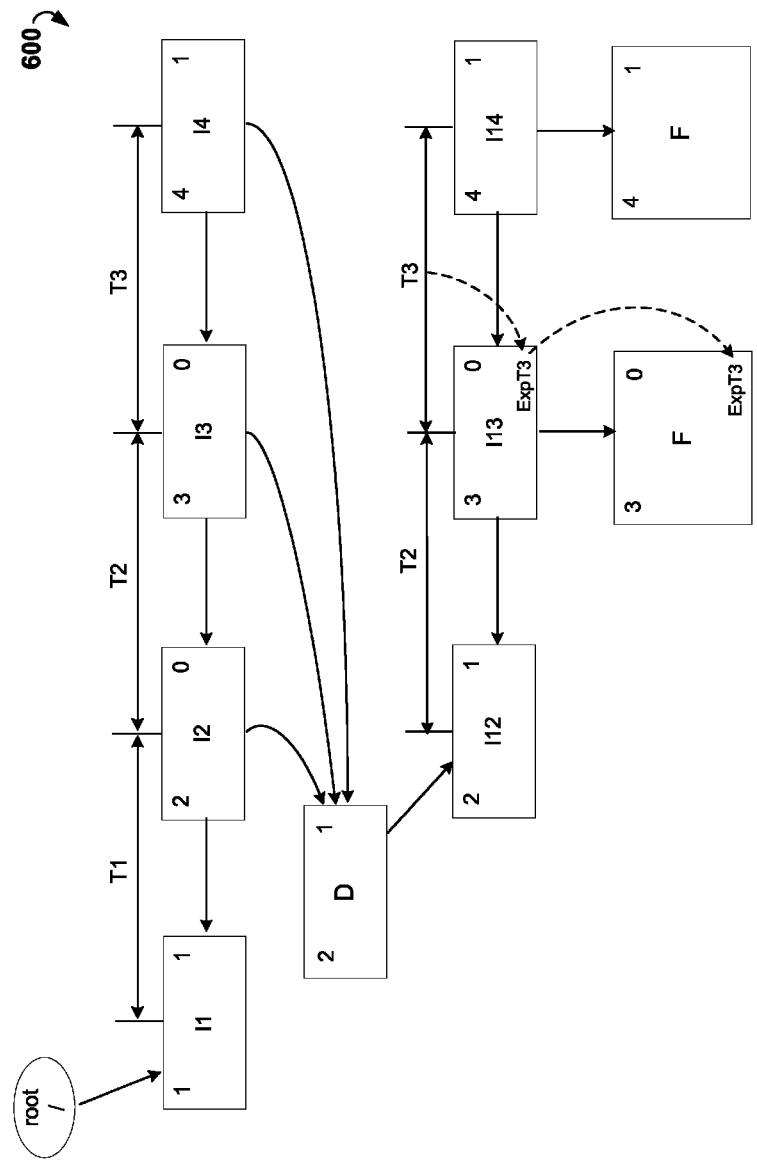
FIG. 6 shows an example of a history of snapshots of a file system containing a root directory, a subdirectory, and a file in the subdirectory.

An example 600 of the file system is shown in FIG. 6. This exemplary system corresponds to the system with one directory D and one file named F residing in this directory. The chain of the linked Inodes I12, I13, and I14 is associated with the file F. Inodes I13 and I14 each point to a version of file F. The Inode I12 corresponds to the change in the file system caused by the creation of file F. Inode I12 does not point to a version of the file since the file F was empty when it was created. The changes corresponding to Inode I12, I13, and I14 were propagated to the parent of file F which is directory D. Due to this propagation, the chain of Inodes associated with directory D received Inodes I2, I3, and I4. The SnapID of objects are shown in left top corners, and the Inodes and objects created in a single change have the same value of SnapID.

In some embodiments, the expiration times for the Inodes and the data objects referenced by them can be determined based on the lifetime of this Inode. The lifetime is the time that passed from the moment when Inode was created at the top of the chain and the moment when another Inode closed it. In the example shown in FIG. 6, the lifetime of Inode I12 is T2 and the lifetime of Inode I13 is T3.

Thus, in certain embodiments, the Inode whose lifetime crosses a larger policy interval receives a later expiration, and vice versa, the Inode whose lifetime crosses only smaller policy intervals, or none, receives an earlier expiration.

In some embodiments, a SnapID range can be defined to protect objects that belong to a range from deletion by the garbage collection process. A special boundary parameter called the Fluxsnap can be used to establish the SnapID range. The garbage collection will be prohibited from deleting the objects with SnapID greater than or equal to the Fluxsnap. During the lifetime of the file system the Fluxsnap can be moved forward to narrow the range for protection from the garbage collection. Newly created objects can be temporarily protected by assigning them a SnapID greater than or equal to the Fluxsnap, and then if these objects are meant to become live objects and be kept longer, they will be assigned a non-zero reference count before the Fluxsnap is allowed to be advanced. Once the Fluxsnap is advanced, any objects that have not been protected by a reference count will become eligible for deletion.

In some embodiments, the versions of the filesystem concept of an Inode may be represented using trees of immutable objects containing references to the various versions of each Inode, where the Inodes themselves need not contain direct references to previous Inode versions. This representation of Inodes as a tree of objects may be in addition to, or instead of, the representation of Inodes as a chain of versions of each Inode. In such embodiments where the Inodes are represented as a tree of immutable objects, the special rules for Inodes formerly described need not be applied, and the objects for this representation may follow the standard rules for reference counting and expiration times.

Figure 7:
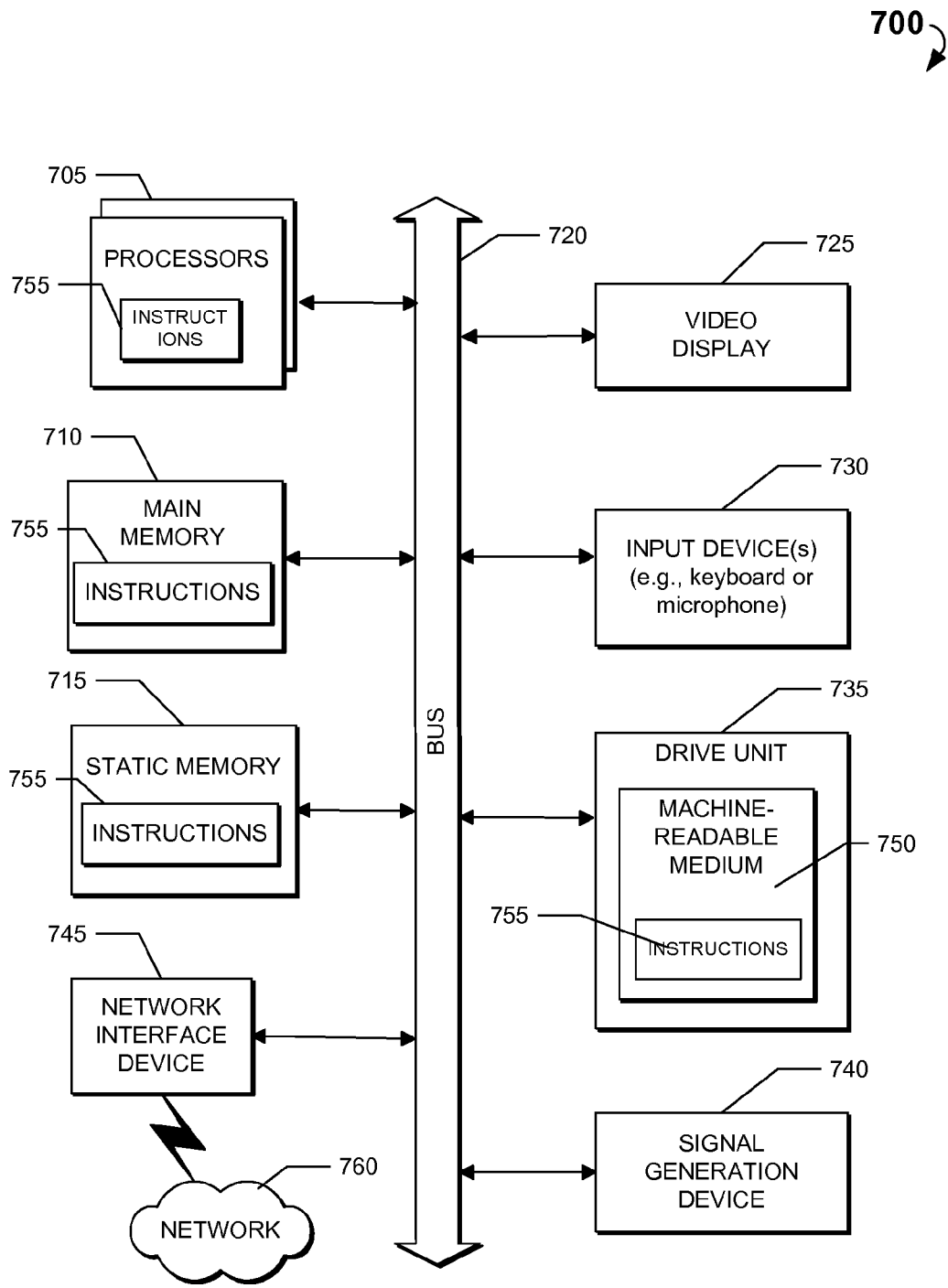
FIG. 7 shows a diagrammatic representation of a computing device for a machine in the example electronic form of a computer system, within which a set of instructions for causing the machine to perform any one or more of the methodologies discussed herein can be executed.

FIG. 7 shows a diagrammatic representation of a computing device for a machine in the example electronic form of a computer system 700, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant, a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU), or both), and a main memory 710 and a static memory 715, which communicate with each other via a bus 720. The computer system 700 can further include a video display unit 725 (e.g., a liquid crystal display). The computer system 700 can also include at least one input device 730, such as an alphanumeric input device (e.g., a keyboard), a cursor control device (e.g., a mouse), a microphone, a digital camera, a video camera, and so forth. The computer system 700 also includes a disk drive unit 735, a signal generation device 740 (e.g., a speaker), and a network interface device 745.

The disk drive unit 735 includes a computer-readable medium 750, which stores one or more sets of instructions and data structures (e.g., instructions 755) embodying or utilized by any one or more of the methodologies or functions described herein. The instructions 755 can also reside, completely or at least partially, within the main memory 710 and/or within the processors 705 during execution thereof by the computer system 700. The main memory 710 and the processors 705 also constitute machine-readable media.

The instructions 755 can further be transmitted or received over the network 760 via the network interface device 745 utilizing any one of a number of well-known transfer protocols (e.g., Hyper Text Transfer Protocol (HTTP), CAN, Serial, and Modbus). For example, the network 760 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

While the computer-readable medium 750 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, a technique for garbage collection of objects in a file system is disclosed. This technique is based on a hybrid of a reference counting technique and propagation of expiration times.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for hybrid garbage collection of objects in a file system, the method comprising:
    associating a reference counter with an object in the file system;
    associating an expiration time with the object, the expiration time being a period of time for which the object is kept in the file system after the reference counter associated with the object becomes zero;
    associating a version identifier with the object;
    keeping the object in the file system while the reference counter of the object is non-zero; and
    wherein in response to determining that the reference counter of the object is zero, keeping the object in the file system up to the expiration time associated with the object.

2. The method of claim 1, wherein in response to a new reference referring to the object being added, increasing by one the reference counter associated with the object.

3. The method of claim 1 further comprising:
    determining that a second reference counter associated with an existing reference referring to the object is zero; and
    in response to the determination:
        decreasing by one the reference counter of the object; and
        setting the expiration time associated with the object to the latest of the expiration time of the object and an expiration time of the reference.

4. The method of claim 1 further comprising:
    determining that the reference counter associated with the object is zero and a new reference referring the object is added, a new reference counter associated with the new reference being non-zero; and
    in response to the determination:
        increasing by one the reference counter associated with the object; and
        setting the expiration time associated with the object to the latest of the expiration time of the object and an expiration time of the new reference.

5. The method of claim 1, wherein the version identifier is monotonically increased with a change of the file system, the change of the file system corresponding to adding at least one new object to the file system.

6. The method of claim 5, further comprising:
    assigning the same version identifier to the at least one new object and all objects added to the file system due to the addition of the at least one new object.

7. The method of claim 1 further comprising:
keeping the object in the file system while the version identifier associated with the object is larger than a predefined maximum version.

8. The method of claim 1 further comprising
providing a chain of reference objects to subsequently refer versions of the object, wherein
a second reference object from the chain refers to a first version of the object;
a last reference object in the chain refers to a second-to-last version of the object;
a reference counter associated with a first reference object from the chain is set to one;
a reference counter associated with the last reference object from the chain is set to one; and
a reference counter associated with a reference object from the chain between the first reference object and the last reference object is equal to zero.

9. The method of claim 8, further comprising, in response to adding a new version of the object to the file system:
determining an expiration time associated with the last reference object in the chain;
setting the reference counter associated with the last reference object in the chain to zero; and
adding a new reference object to an end of the chain, the new reference object referring to the new version of the object.

10. The method of claim 9, wherein the expiration time associated with the last reference object in the chain is calculated based on a time period between addition of a last version of the object and the new version of the object.

11. A non-transitory computer-readable medium having instructions stored thereon, which when executed by one or more processors, cause the one or more processors to perform a method for hybrid garbage collection of objects in a file system, the method comprising:
associating a reference counter with an object in the file system;
associating an expiration time with the object, the expiration time being a period of time for which the object is kept in the file system after the reference counter associated with the object becomes zero;
associating a version identifier with the object;
keeping the object in the file system while the reference counter of the object is non-zero; and
wherein in response to determining that the reference counter of the object is zero, keeping the object in the file system up to the expiration time associated with the object.

12. The non-transitory computer-readable medium of claim 11, further comprising, in response to a new reference referring to the object being added, increasing by one the reference counter associated with the object.

13. The non-transitory computer-readable medium of claim 11, further comprising:
determining that a second reference counter associated with an existing reference referring to the object is zero; and
in response to the determination:
decreasing by one the reference counter of the object; and
setting the expiration time associated with the object to the latest of the expiration time of the object and an expiration time of the reference.

14. The non-transitory computer-readable medium of claim 11, further comprising:
determining that the reference counter associated with the object is zero and a new reference referring the object is added, a new reference counter associated with the new reference being non-zero; and
in response to the determination:
increasing by one the reference counter associated with the object; and
setting the expiration time associated with the object to the latest of the expiration time of the object and an expiration time of the new reference.

15. The non-transitory computer-readable medium of claim 11, wherein the version identifier is monotonically increased with a change of the file system, the change of the file system being associated with adding at least one new object to the file system.

16. The non-transitory computer-readable medium of claim 15, further comprising:
assigning the same version identifier to the at least one new object and all objects added to the file system due to the addition of the at least one new object.

17. The non-transitory computer-readable medium of claim 11 further comprising:
keeping the object in the file system while the version identifier associated with the object is larger than a predefined maximum version.

18. The non-transitory computer-readable medium of claim 11, further comprising:
providing a chain of reference objects for subsequent reference versions of the object, wherein
a second reference object from the chain refers to a first version of the object;
a last reference object in the chain refers to a second-to-last version of the object;
a reference counter associated with a first reference object from the chain is set to one;
a reference counter associated with the last reference object from the chain is set to one; and
a reference counter associated with a reference object from the chain between the first reference object and the last reference object is equal to zero.

19. The non-transitory computer-readable medium of claim 18, further comprising, in response to adding a new version of the object to the file system:
determining an expiration time associated with the last reference object in the chain;
setting the reference counter associated with the last reference object in the chain to zero; and
adding a new reference object to an end of the chain, the new reference object referring to a previous newest version of the object.

20. The non-transitory computer-readable medium of claim 19, wherein the expiration time associated with the last reference object in the chain is calculated based on a time period between adding a last version of the object and the new version of the object.

* * * * *